United States Patent
Shen

(10) Patent No.: US 8,123,049 B2
(45) Date of Patent: Feb. 28, 2012

(54) POT STAND

(76) Inventor: John Wei Shen, Diamond Bar, CA (US)

( * ) Notice: Subject to any disclaimer, the term of this patent is extended or adjusted under 35 U.S.C. 154(b) by 374 days.

(21) Appl. No.: 12/607,594

(22) Filed: Oct. 28, 2009

(65) Prior Publication Data

US 2011/0094982 A1    Apr. 28, 2011

(51) Int. Cl.
  *A47G 19/08* (2006.01)
(52) U.S. Cl. ..................................... 211/41.11
(58) Field of Classification Search ............... 211/41.11, 211/85.23, 88.03, 85, 195; 206/423; 47/45; 248/126; D7/704
  See application file for complete search history.

(56) References Cited

U.S. PATENT DOCUMENTS

| | | | | |
|---|---|---|---|---|
| 1,518,148 A * | 12/1924 | Kamenstein | ............... | 211/200 |
| 1,716,868 A * | 6/1929 | Stephens | ............... | 211/74 |
| 1,897,905 A * | 2/1933 | Johnson | ............... | 248/121 |
| 2,297,358 A * | 9/1942 | Kramer | ............... | 211/85 |
| 3,100,459 A * | 8/1963 | Liss et al. | ............... | 108/91 |
| 4,093,166 A * | 6/1978 | Iida | ............... | 248/126 |
| 4,364,480 A * | 12/1982 | Ohno | ............... | 211/85 |
| 5,542,731 A * | 8/1996 | Wills | ............... | 294/161 |
| 7,168,580 B2 * | 1/2007 | Larimer et al. | ............... | 211/200 |
| D541,603 S * | 5/2007 | Anker | ............... | D7/704 |
| 7,997,429 B2 * | 8/2011 | Anker | ............... | 211/186 |
| 2005/0039394 A1* | 2/2005 | Kelly | ............... | 47/45 |
| 2005/0144839 A1* | 7/2005 | Morgan et al. | ............... | 47/45 |

* cited by examiner

*Primary Examiner* — Sarah Purol
(74) *Attorney, Agent, or Firm* — Clement Cheng

(57) ABSTRACT

A pot stand has a deployed position and a folded position and includes vertical members and horizontal members. The horizontal members are connected to the vertical members at a junction. The horizontal members are elongated planar members. Top faces formed on the horizontal members. Down bends are formed on the horizontal members. Down bends continue from the top faces. Lower faces are formed on the horizontal members. Lower faces continue from the down bends. A connector assembly has a top connector and a bottom connector. The top connector is pivotally connected to an upper surface of the lower faces. The bottom connector is pivotally connected to a lower surface of the lower faces. There is a top level formed from horizontal members for storing articles on the top level. A middle level is for storing articles on the middle level, and a bottom level.

14 Claims, 2 Drawing Sheets

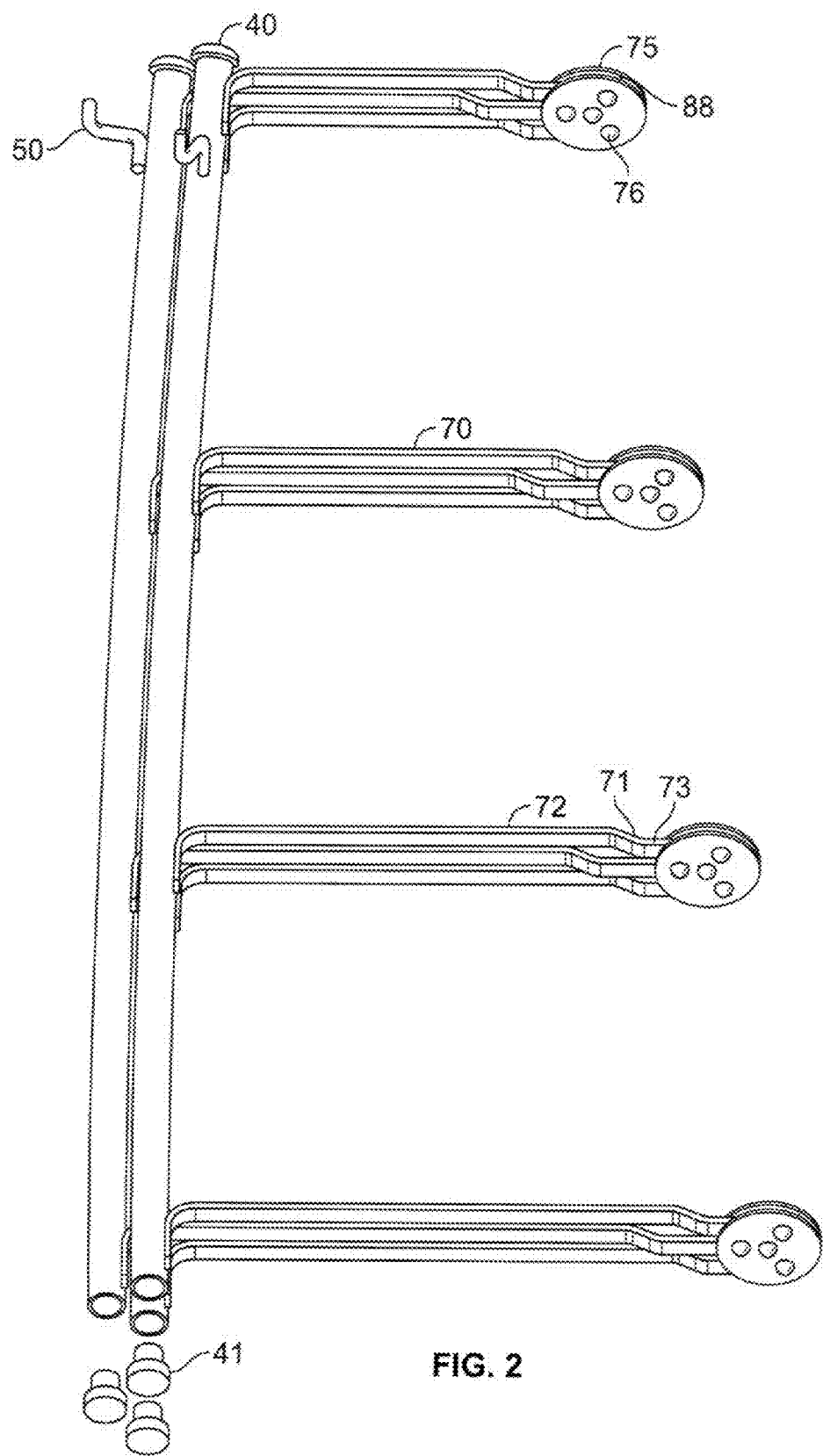

POT STAND

DISCUSSION OF RELATED ART

A variety of inventions have been conceived for storing and supporting pots and pans. Traditionally, pots and pans have been held by hanging from the wall. Other inventors have created hanging pot rack and additionally adding lighting elements such as shown in Thurlow U.S. Pat. No. 4,967,327 issued Oct. 30, 1990. The lighting elements add decorative effect to the pot rack. The pot rack further as a grid of metal bars for supporting the pots, and for hanging pots from the grid. Thurlow, the disclosure of which is incorporated herein by reference, shows the traditional hanging pot rack. Traditionally, pots and pans have also been suspended from a pot rack. Other methods of holding pots and pans include mounting to a wall or cabinet such as shown in Sager as U.S. Pat. No. 2,608,305 issued Aug. 26, 1952. The disclosure of which is incorporated herein by reference.

Tabletop units are also popular. For example, there is Anker in United States publication 2007/0295683 published Dec. 27, 2007 the disclosure of which is incorporated herein by reference. Anker discloses a pot and pan storage unit. The pot and pan storage unit supports pots and pans having vertical members and horizontal members. The construction is a molded construction suitable for plastic injection molded snap together assembly.

SUMMARY OF THE INVENTION

The present invention pot stand has preferably three or more vertical members formed as tubes. The vertical members can be made of a metal such as steel. The vertical members are substantially vertical, not exactly vertical and bend toward the center of the pot stand. The vertical members include horizontal members. The vertical members are attached to horizontal members at a junction, such as a downward junction. The horizontal members are also preferably made of metal such as steel. The horizontal members are preferably made of a strip of metal, bent to shape. The downward junction can receive a rivet or welding to the vertical member.

The horizontal member has a top face in planar configuration and elongated configuration. The top face supports a pot. The horizontal member includes a down bend near the center of the pot stand. The down bend continues to a lower face that is at a lower level than a top face. The lower face preferably is connected to a top connector and a bottom connector at a rivet. The lower face supports a trivet plate by receiving trivet feet on the trivet into a trivet hole disposed on the lower face. Preferably, each lower face of the pot stand will receive a single trivet plate, and a single trivet foot.

Because the lower face has a thickness, being sandwiched between the top connector and the bottom connector creates a gap between the top connector and the bottom connector. The top connector is preferably a flat round disc, and the bottom connector is preferably also a flat round disc. A central rivet is preferably located at the central axis of the apparatus.

An upper cap can fit into an upper opening of the vertical member. A lower cap can fit into a lower opening of the vertical member. The lower cap provides a soft foot to avoid scratching a table. The upper cap and lower cap are preferably made of plastic. The horizontal member rotates relative to the top connector and relative to the bottom connector. The top connector and the bottom connector can also be riveted to each other directly with a central rivet, such that the central rivet does not pass through or touch the horizontal members.

Each of the three horizontal members is riveted to a lateral portion of both the top connector and the bottom connector.

The lower face supporting the trivet plate has a vertical dimension decreased by the down bend such that the trivet plate is slightly lower than or an equal level to the horizontal member.

A top layer, a pair of middle layers, and a bottom layer can hold a total of four pots and pans. Additionally, a hook can also be welded to the vertical member for holding additional pots and pans. If three hooks are included, a total of three parts or pans can be hooked so that the entire apparatus stores at least seven pots and pans. Pots and pans can also be nested inside each other to store more than seven pots and pans.

The present invention also folds so that it can be stored. When folding, a non-folding vertical member does not fold relative to the connector assembly which comprises the top connector and the bottom connector. The connector assembly only folds relative to the other two folding vertical members.

DRAWINGS

FIG. 2 is a perspective folded position view of the present invention pot stand.

Figure 1:
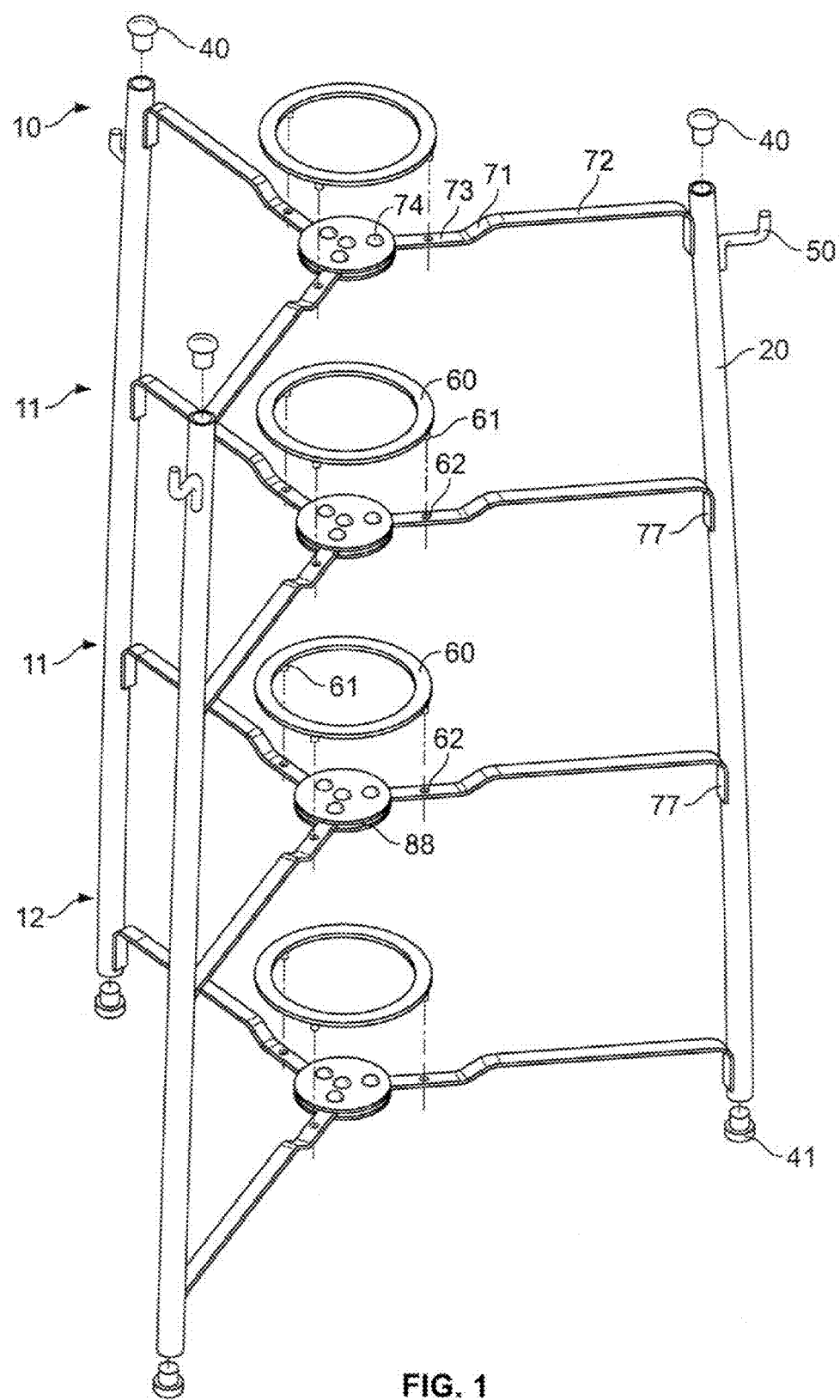
FIG. 1 is a perspective deployed position view of the present invention pot stand.

The call out list of elements is used consistently in the drawings:

10 Top Layer
11 Middle Layer
12 Bottom Layer
20 Vertical Member
40 Top Cap
41 Bottom Cap
50 Hook
60 Trivet Plate
61 Trivet Feet
62 Trivet Hole
70 Horizontal Member
71 Down Bend
72 Top Face
73 Lower Face
74 Rivet
75 Top Connector
76 Bottom Connector
77 Downward Junction
88 Gap

DETAILED DISCUSSION OF THE PREFERRED EMBODIMENT

The pot stand has a deployed position and a folded position. The pot stand can deploy and unfold during use to have equally distant and spaced vertical members 20, and the pot stand can fold into a flat folded position for storage or shipping.

The present invention pot stand as seen in FIG. 1 has preferably three or more vertical members 20 formed as tubes. The vertical members can be made of a metal such as steel. The vertical members are substantially vertical, not exactly vertical and bend toward the center of the pot stand. The vertical members include horizontal members 70. The vertical members are attached to horizontal members 70 at a junction, such as a downward junction 77. The horizontal members are also preferably made of metal such as steel. The horizontal members are preferably made of a strip of metal, bent to shape. The downward junction 77 can receive a rivet or welding to the vertical member 20. The horizontal members are preferably but do not have to be elongated planar members.

The horizontal member 70 has a top face 72 in planar configuration and elongated configuration. The top face 72 supports a pot. The horizontal member 70 includes a down bend 71 near the center of the pot stand. The down bend 71 continues to a lower face 73 that is at a lower level than a top face 72. The lower face 73 preferably is connected to a top connector 75 and a bottom connector 76 at a rivet 74. The lower face 73 supports a trivet plate 60 by receiving trivet feet 61 on the trivet into a trivet hole 62 disposed on the lower face. Preferably, each lower face of the pot stand will receive a single trivet plate, and a single trivet foot 61.

Because the lower face 73 has a thickness, being sandwiched between the top connector 75 and the bottom connector 76 creates a gap 88 between the top connector 75 and the bottom connector 76. The top connector is preferably a flat round disc, and the bottom connector is preferably also a flat round disc. A connector assembly has a top connector and a bottom connector. The top connector is pivotally connected to an upper surface of the lower faces, and the bottom connector is pivotally connected to a lower surface of the lower faces.

An upper cap 40 can fit into an upper opening of the vertical member 20. A lower cap 41 can fit into a lower opening of the vertical member 20. The lower cap 41 provides a soft foot to avoid scratching a table. The upper cap and lower cap are preferably made of plastic. The horizontal member 70 rotates relative to the top connector 75 and relative to the bottom connector 76. The top connector 75 and the bottom connector 76 can also be riveted to each other directly with a central rivet, such that the central rivet does not pass through or touch the horizontal members 70. Each of the three horizontal members is riveted to a lateral portion of both the top connector 75 and the bottom connector 76.

The lower face 73 supporting the trivet plate 60 has a vertical dimension decreased by the down bend 71 such that the trivet plate 60 is slightly lower than or an equal level to the horizontal member 70. The downward junction 77 is where the metal is folded down and attached.

A top layer 10, a pair of middle layers 11 and a bottom layer 12 can hold a total of four pots and pans. Additionally, a hook 50 can also be welded to the vertical member 24 for holding additional pots and pans. If three hooks are included, a total of three parts or pans can be hooked so that the entire apparatus stores at least seven pots and pans. Pots and pans can also be nested inside each other to store more than seven pots and pans.

The present invention also folds so that it can be stored as seen in FIG. 2. When folding, a non-folding vertical member does not fold relative to the connector assembly which comprises the top connector 75 and the bottom connector 76. The connector assembly only folds relative to the other two folding vertical members.

The trivet also called the trivet plate can be a ring, or not hollow in the middle. The trivet has preferably a plurality of feet extending from a lower surface of the trivet. The feet can be plastic or metal.

During assembly, the vertical members when formed as tubes, and further including upper caps can be preassembled or the end user can insert each upper cap into each upper opening of each vertical member. The upper caps are preferably made of plastic.

Although the invention has been disclosed in detail with reference only to the preferred embodiments, those skilled in the art will appreciate that various other embodiments can be provided without departing from the scope of the invention. Accordingly, the invention is defined only by the claims set forth below.

The invention claimed is:

1. A pot stand having a deployed position and a folded position comprising:
   a. vertical members;
   b. horizontal members, wherein the horizontal members are connected to the vertical members at a junction, wherein the horizontal members are elongated planar members;
   c. top faces formed on the horizontal members;
   d. down bends formed on the horizontal members, wherein the down bends continue from the top faces;
   e. lower faces formed on the horizontal members, wherein the lower faces continue from the down bends;
   f. a connector assembly comprising a top connector and a bottom connector, wherein the top connector is pivotally connected to an upper surface of the lower faces, wherein the bottom connector is pivotally connected to a lower surface of the lower faces; and
   g. a top level formed from horizontal members for storing articles on the top level, further comprising a pair of middle levels for storing articles on the pair of middle levels, further comprising a bottom level for storing articles on the bottom level, wherein the top level is comprised of three or more horizontal members, wherein each of the pair of middle levels is comprised of three or more horizontal members, wherein the bottom level is comprised of three or more horizontal members.

2. The pot stand of claim 1, wherein the vertical members are formed as tubes, and further comprising caps, wherein each cap fits in each upper opening of each vertical member formed as a tube.

3. The pot stand of claim 1, wherein the vertical members are attached to the horizontal members at a welded downward junction.

4. The pot stand of claim 1, further comprising a trivet plate received on the lower faces, further comprising trivet feet extending from a lower surface of the trivet plate and extending into trivet holes formed on the lower faces, wherein each lower face has at least one trivet hole.

5. The pot stand of claim 1, further comprising a gap between the top connector and the bottom connector, wherein the top connector is preferably a flat round disc, and the bottom connector is a flat round disc.

6. The pot stand of claim 1, further comprising a central rivet, such that the central rivet does not pass through or touch the horizontal members, wherein each of the three horizontal members is riveted to a lateral portion of both the top connector and the bottom connector.

7. The pot stand of claim 1, wherein the trivet plate is slightly lower than or an equal level to the horizontal member.

8. A pot stand having a deployed position and a folded position comprising:
   a. vertical members;
   b. horizontal members, wherein the horizontal members are connected to the vertical members at a junction, wherein the horizontal members are elongated planar members;
   c. top faces formed on the horizontal members;
   d. down bends formed on the horizontal members, wherein the down bends continue from the top faces;
   e. lower faces formed on the horizontal members, wherein the lower faces continue from the down bends;
   f. a connector assembly comprising a top connector and a bottom connector, wherein the top connector is pivotally connected to an upper surface of the lower faces, wherein the bottom connector is pivotally connected to a lower surface of the lower faces; and g. a top level formed from horizontal members for storing articles on the top level, further comprising a middle level for storing articles on the middle level, further comprising a bottom level for storing articles on the bottom level, wherein the top level is comprised of three or more horizontal members, wherein each of the middle level is comprised of three or more horizontal members, wherein the bottom level is comprised of three or more horizontal members.

9. The pot stand of claim 8, wherein the vertical members are formed as tubes, and further comprising caps, wherein each cap fits in each upper opening of each vertical member formed as a tube.

10. The pot stand of claim 8, wherein the vertical members are attached to the horizontal members at a welded downward junction.

11. The pot stand of claim 8, further comprising a trivet plate received on the lower faces, further comprising trivet feet extending from a lower surface of the trivet plate and extending into trivet holes formed on the lower faces, wherein each lower face has at least one trivet hole.

12. The pot stand of claim 8, further comprising a gap between the top connector and the bottom connector, wherein the top connector is preferably a flat round disc, and the bottom connector is a flat round disc.

13. The pot stand of claim 8, further comprising a central rivet, such that the central rivet does not pass through or touch the horizontal members, wherein each of the three horizontal members is riveted to a lateral portion of both the top connector and the bottom connector.

14. The pot stand of claim 8, wherein the trivet plate is slightly lower than or an equal level to the horizontal member.

* * * * *